US011247520B2

(12) United States Patent
Niewiadomski et al.

(10) Patent No.: US 11,247,520 B2
(45) Date of Patent: Feb. 15, 2022

(54) SYSTEM AND METHOD FOR TRAILER ALIGNMENT

(71) Applicant: Ford Global Technologies, LLC, Dearborn, MI (US)

(72) Inventors: Luke Niewiadomski, Dearborn, MI (US); Roger Arnold Trombley, Ann Arbor, MI (US); George Edmund Walley, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 16/359,478

(22) Filed: Mar. 20, 2019

(65) Prior Publication Data

US 2020/0298639 A1    Sep. 24, 2020

(51) Int. Cl.
  *B60D 1/36* (2006.01)
  *B60R 1/00* (2006.01)
  *B60R 11/04* (2006.01)
  *B62D 15/02* (2006.01)
  *G05D 1/02* (2020.01)
  *B60D 1/06* (2006.01)

(52) U.S. Cl.
  CPC .............. *B60D 1/36* (2013.01); *B60D 1/065* (2013.01); *B60R 1/003* (2013.01); *B60R 11/04* (2013.01); *B62D 15/021* (2013.01); *B62D 15/026* (2013.01); *G05D 1/0246* (2013.01); *B60R 2300/808* (2013.01)

(58) Field of Classification Search
  CPC .......... B60D 1/36; B60D 1/065; B60R 1/003; B60R 11/04; B60R 2300/808; B62D 15/021; B62D 15/026; G05D 1/0246; B60W 10/20; B60W 10/18; B60W 10/22; B60W 2540/18
  See application file for complete search history.

(56) References Cited

U.S. PATENT DOCUMENTS

| 7,429,051 | B2 | 9/2008 | Bauer et al. |
| 9,102,271 | B2 | 8/2015 | Trombley et al. |
| 9,434,381 | B2 | 9/2016 | Windeler |
| 9,457,632 | B1 | 10/2016 | Windeler et al. |
| 9,834,049 | B2 | 12/2017 | Strand |
| 9,895,945 | B2 | 2/2018 | Lavoie |
| 2006/0293800 | A1 | 12/2006 | Bauer et al. |
| 2009/0040300 | A1 | 2/2009 | Scribner |
| 2013/0226390 | A1 | 8/2013 | Luo et al. |

(Continued)

FOREIGN PATENT DOCUMENTS

DE    102014110498 A1    1/2016

*Primary Examiner* — Minnah L Seoh
*Assistant Examiner* — Marlon A Arce
(74) *Attorney, Agent, or Firm* — Raymond Coppiellie; Price Heneveld LLP

(57) ABSTRACT

A vehicle maneuvering apparatus includes an imaging device configured to capture image data and a controller in communication with a vehicle maneuvering system. The controller is configured to identify a coupler position of a trailer in the image data and compare a coupler height of the coupler position with a hitch height of a hitch ball. In response to the coupler height being insufficient to clear the hitch height, the controller is further configured to calculate a target position laterally offset from the coupler position and communicate the target position to the vehicle maneuvering system.

20 Claims, 9 Drawing Sheets

(56) References Cited

U.S. PATENT DOCUMENTS

| | | |
|---|---|---|
| 2015/0115571 A1 | 4/2015 | Zhang et al. |
| 2016/0288601 A1* | 10/2016 | Gehrke ................ G06K 9/6201 |
| 2018/0081370 A1* | 3/2018 | Miller ...................... B60D 1/36 |
| 2018/0141397 A1 | 5/2018 | Opitz |
| 2018/0215382 A1* | 8/2018 | Gupta ............. B60W 30/18036 |
| 2018/0312022 A1* | 11/2018 | Mattern ............... G05D 1/0225 |
| 2019/0340787 A1* | 11/2019 | Ramirez Llanos ....... G06T 7/75 |
| 2020/0039582 A1* | 2/2020 | Ling .................. B62D 15/0285 |
| 2020/0062257 A1* | 2/2020 | Berkemeier ............. B60D 1/36 |
| 2021/0114521 A1* | 4/2021 | Niewiadomski ........ B60R 1/003 |

\* cited by examiner

SYSTEM AND METHOD FOR TRAILER ALIGNMENT

FIELD OF THE DISCLOSURE

The present disclosure generally relates to a system for assisting in a vehicle-trailer hitching operation. In particular, the present disclosure relates to a system for controlling an alignment between a vehicle and a coupler of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle maneuvering apparatus is disclosed. The apparatus comprises an imaging device configured to capture image data and a controller in communication with a vehicle maneuvering system. The controller is configured to identify a coupler position of a trailer in the image data and compare a coupler height of the coupler position with a hitch height of a hitch ball. In response to the coupler height being insufficient to clear the hitch height, the controller is further configured to calculate a target position laterally offset from the coupler position and communicate the target position to the vehicle maneuvering system.

Examples of the first aspect of the disclosure can include any one or a combination of the following features:
  the controller is further configured to identify a trailer heading direction based on the image data;
  the trailer heading direction is identified in the image data based on a longitudinal direction of a tongue extending from the coupler;
  the lateral offset is calculated in a direction perpendicular to the trailer heading;
  the controller is further configured to identify a difference between a vehicle heading direction and the trailer heading direction;
  the controller is further configured to calculate a direction of the lateral offset of the target position relative to the coupler position based on the difference between the vehicle heading direction and the trailer heading direction;
  lateral offset is applied in a direction projecting the target position toward the hitch ball based on the difference between the vehicle heading direction and the trailer heading direction;
  the lateral offset is calculated based on a radius of the hitch ball and a lateral width of the coupler;
  the controller is further configured to identify the width of the coupler in the image data;
  the controller is configured to identify at least one of the radius and the height of the hitch ball based on the image data;
  the controller is further configured to control the vehicle maneuvering system to control a steering angle and motion of the vehicle aligning the hitch ball with the target position; and/or
  the target position is laterally offset such that the coupler position may be adjusted in the lateral direction limiting a manual adjustment of a longitudinal position of the trailer required for connecting the coupler with the hitch ball.

According to another aspect of the present disclosure, a method for controlling a vehicle is disclosed. The method comprises identifying a coupler position including a coupler height of a trailer in sensor data and comparing the coupler height with a hitch height of a hitch ball. In response to the coupler height being insufficient to clear the hitch height, the method further comprises calculating a target position for a hitch ball based on the coupler position. The method further comprises controlling a vehicle maneuvering system to control a steering angle and motion of the vehicle aligning the hitch ball with the target position.

Examples of the next aspect of the disclosure can include any one or a combination of the following method steps or features:
  identifying a trailer heading direction based on the sensor data;
  the trailer heading direction is identified in the sensor data based on a longitudinal direction of a tongue extending from the coupler;
  the lateral offset is calculated in a direction perpendicular to the trailer heading;
  identifying a difference between a vehicle heading direction and the trailer heading direction; and/or
  calculating a direction of the lateral offset of the target position relative to the coupler position based on the difference between the vehicle heading direction and the trailer heading direction.

According to yet another aspect of the present disclosure, a vehicle maneuvering system is disclosed. The system comprises a hitch ball mounted on a vehicle, a sensor system configured to capture sensor data, and a controller. The controller is configured to identify a coupler position of a trailer in the sensor data from the sensor system. The controller is further configured to identify a coupler position and a trailer heading direction of a trailer based on the sensor data. The controller is further configured to identify a difference between a vehicle heading direction and the trailer heading direction and calculate a direction of the lateral offset of the target position relative to the coupler position based on the difference between the vehicle heading direction and the trailer heading direction. The controller is further configured to control a motion of the vehicle aligning the hitch ball with the target position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
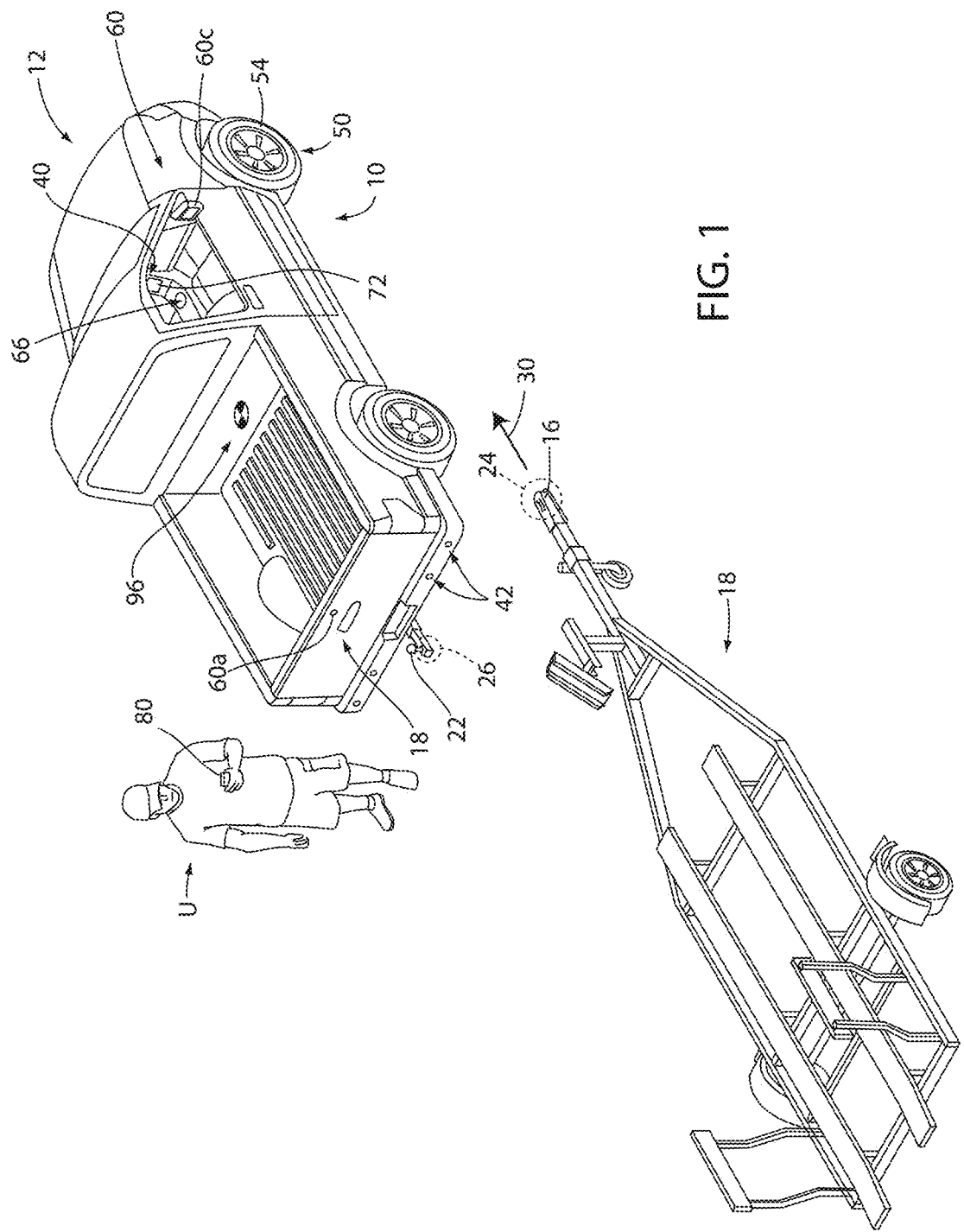
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to identify a height $H_c$ of the coupler 16 to determine whether the coupler 16 is compatible or the height $H_c$ is adequate to clear a height $H_b$ of the hitch ball 22. If the system 10 identifies that the height $H_c$ of the coupler 16 is not sufficient to clear the height $H_b$ of the hitch ball 22, the controller 14 may divert or adjust the vehicle path 20 to position the coupler 16 near the hitch ball 22 but laterally offset from a trajectory or hitch heading direction 30 of the trailer 18. In this configuration, the system 10 may be configured to orient the hitch ball 22 with a predetermined distance from the coupler 16 that is laterally offset from the hitch heading direction 30. In this configuration, the coupler 16 may be lifted by the user U without vertical interference from the hitch ball 22. Accordingly, the user U may manually increase the height $H_c$ of the coupler 16 and swing the coupler 16 to adjust the trajectory 30 of the trailer 18 and lower the coupler 16 in mating connection with the hitch ball 22 without unnecessary effort. For example, the manual adjustment of the coupler 16 may be limited to the lateral adjustment perpendicular to the heading direction 30 such that longitudinal adjustment of the trailer 18 may be avoided.

Figure 2:
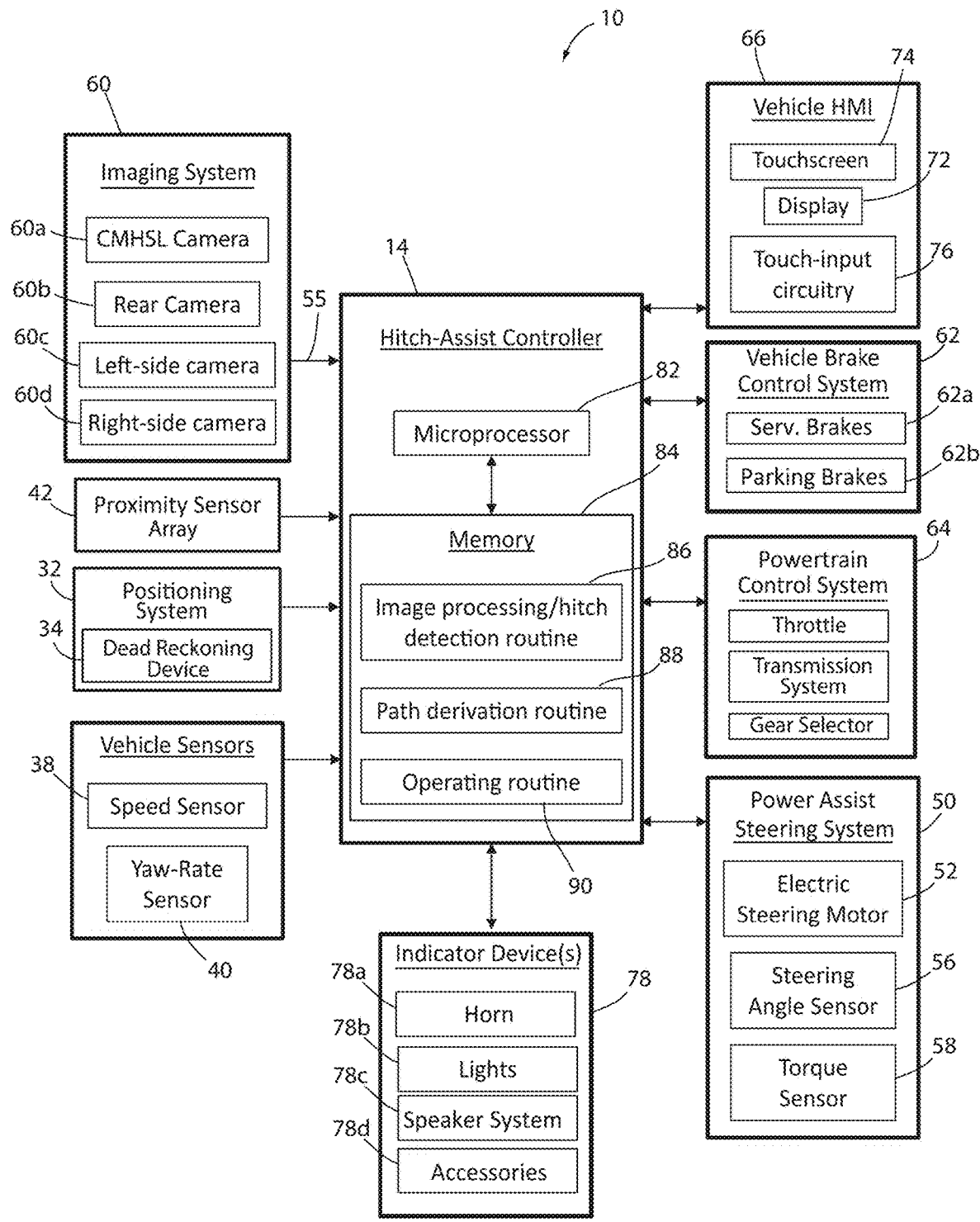
FIG. 2 is a diagram of a system according to an aspect of the disclosure for assisting in aligning the vehicle with a trailer in a position for hitching the trailer to the vehicle.
Figure 3:
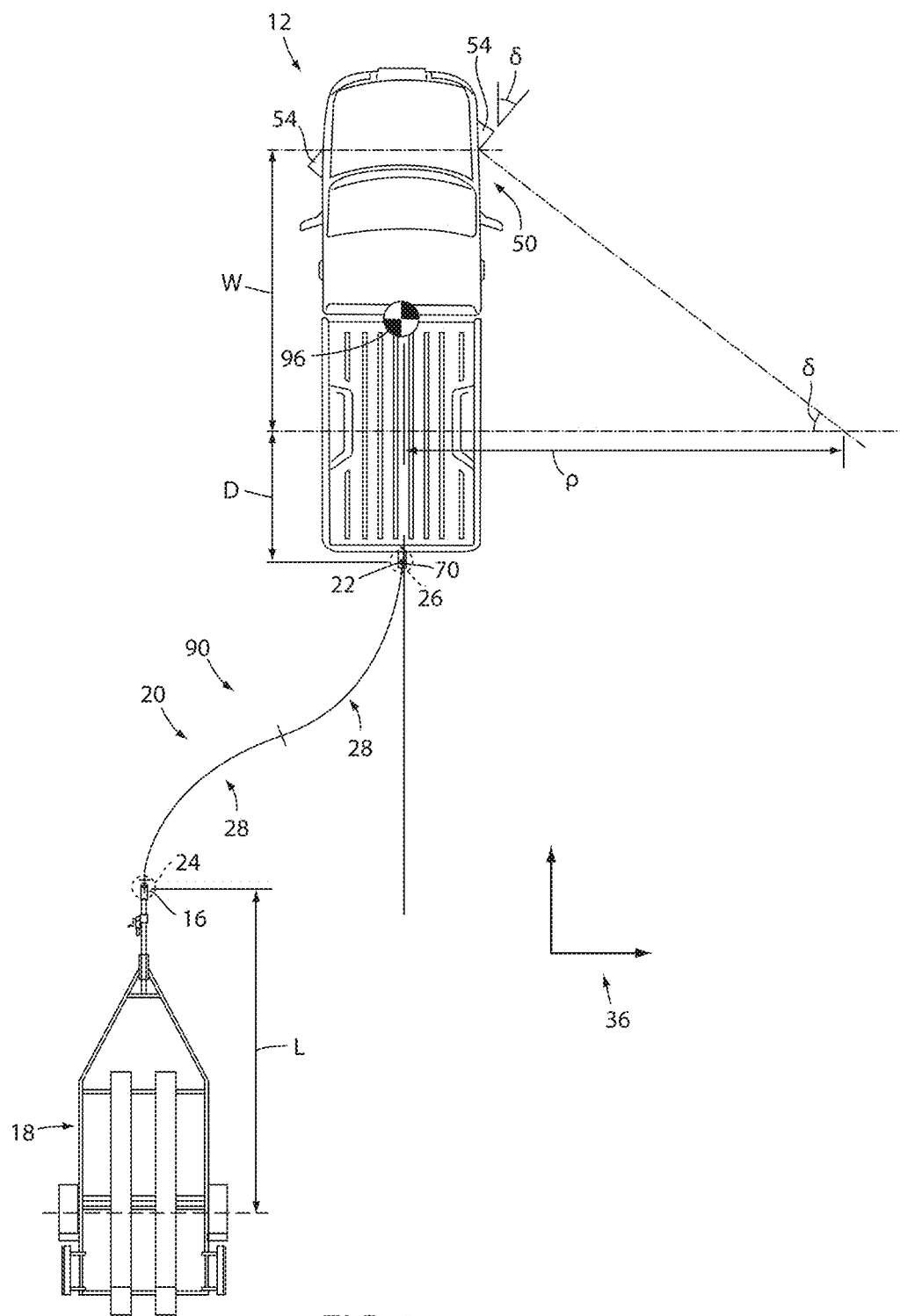
FIG. 3 is a plan view of a vehicle during a step of the alignment sequence with the trailer.
Figure 4:
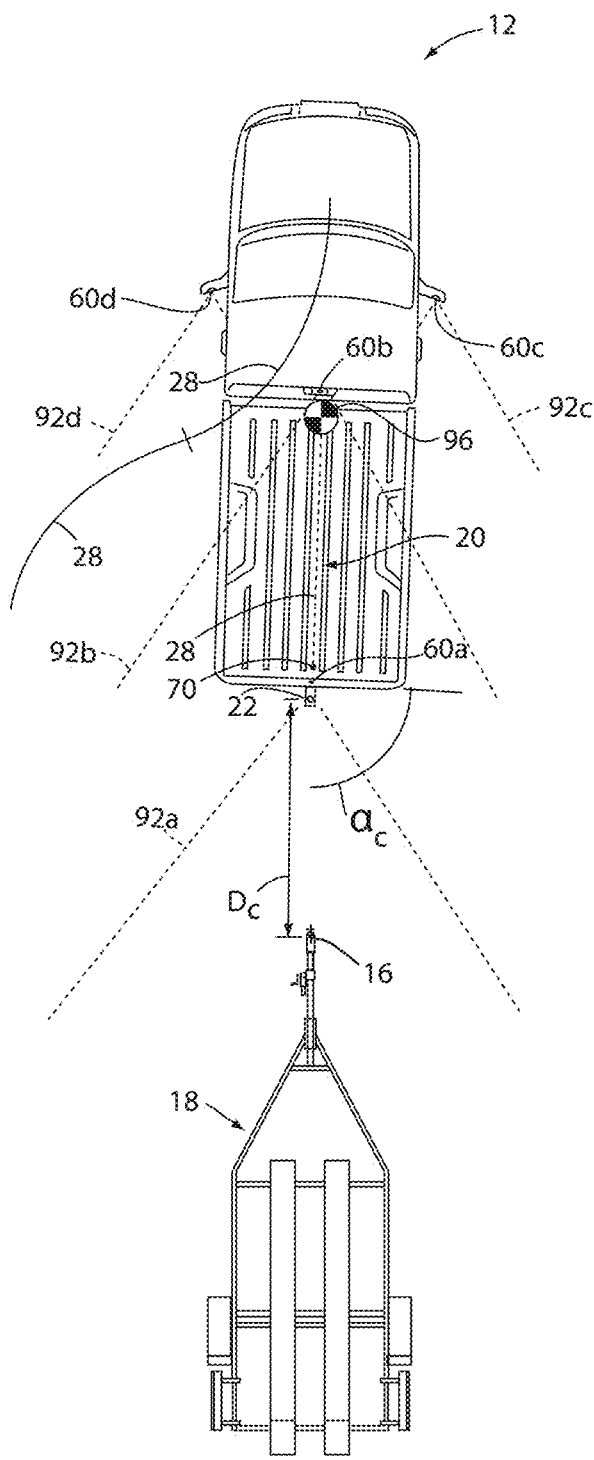
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height $H_c$ and position (e.g., based on the distance $D_c$ and angle $α_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62*a* and a parking brake 62*b*. The parking brake 62*b* may correspond to an electronic parking brake system that may be in communication with the controller 14. Accordingly, in operation, the controller 14 may be configured to control the brakes 62*a* and 62*b* as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. The powertrain control system 64, as shown in the embodiment illustrated in FIG. 2, may also interact with the hitch assist system 10 for regulating speed and acceleration of the vehicle 12 during partial or autonomous alignment with trailer 18. As mentioned above, regulation of the speed of the vehicle 12 may be advantageous to prevent collision with trailer 18.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78*a*, lights 78*b*, a speaker system 78*c*, vehicle accessories 78*d*, etc. In some embodiments, the indicator devices 78 may further include one or more accessories 78*d*, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. Publ. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta} \quad (1)$$

in which the wheelbase W is fixed and the steering angle $\delta$ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

As discussed above, hitch assist system 10 can provide image data to image processing routine 86 that can be used by image processing routine 86 (by the process described above or by other available processes) to determine the height $H_b$ of hitch ball 22 (i.e., a vertical component of the data including the position 24 of coupler 16. The image data may be captured by one or more of the cameras 60a-d of the imaging system 60. Further, hitch assist system 10 can have stored in memory 84 or can otherwise determine the height $H_b$ of hitch ball 22. In one example, during an initial setup routine for hitch assist system 10, a user U can be prompted to install hitch ball 22 by way of assembling a ball mount including hitch ball 22 with a receiver positioned on the rear of vehicle 12. The user U can then be asked to measure the height $H_b$ of the hitch ball 22 (such as to the top or center thereof) and to enter that measurement into memory 84 by way of HMI 66, for example. In this manner, a number of different height measurements for a plurality of hitch balls used in connection with the particular vehicle 12 can be stored in memory 84 and can be selected by the user U. In some embodiments, hitch ball 22 may be within the field of view 92a of rear camera 60a such that image data can be processed to determine the height $H_b$ of hitch ball 22 on a real-time or on-demand basis.

Figure 5:
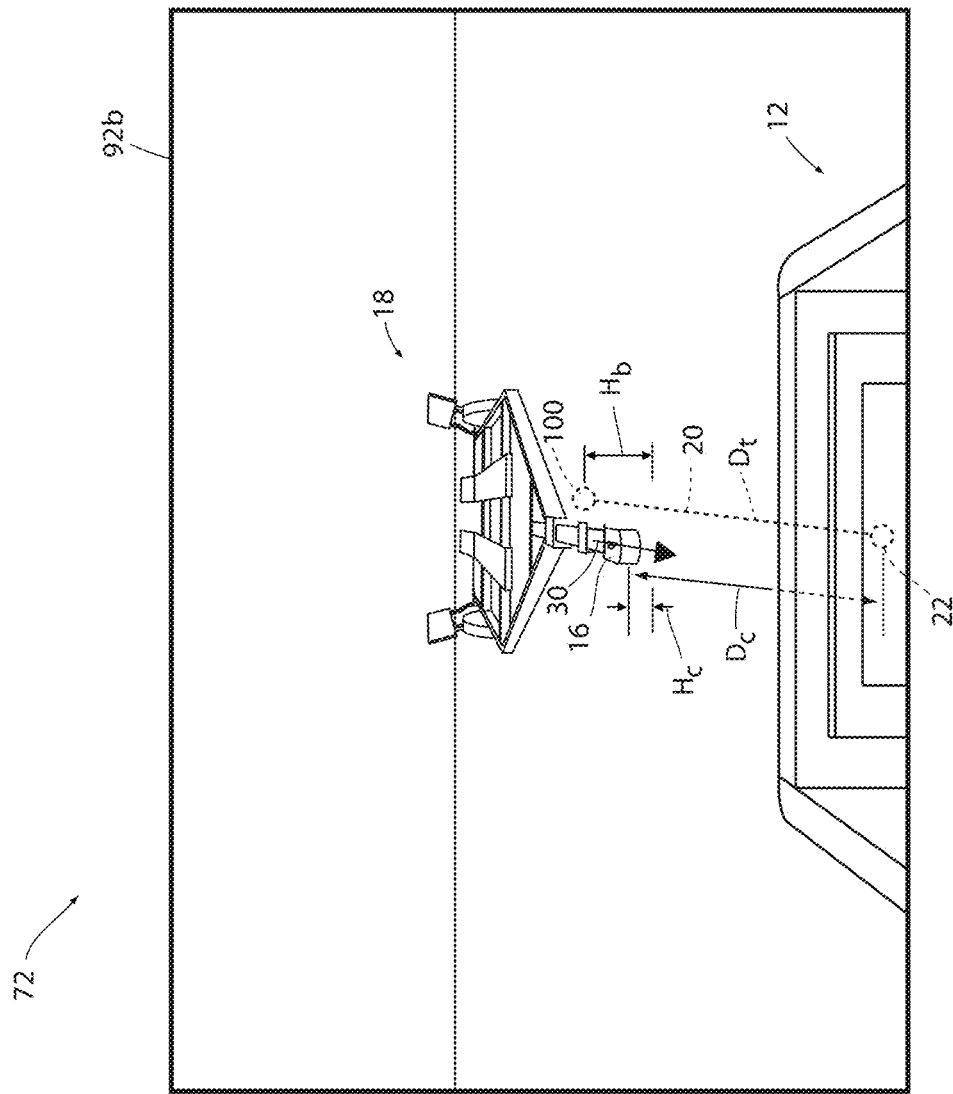
FIG. 5 is a projected view of image data demonstrating an alignment sequence with the trailer.
Figure 6:
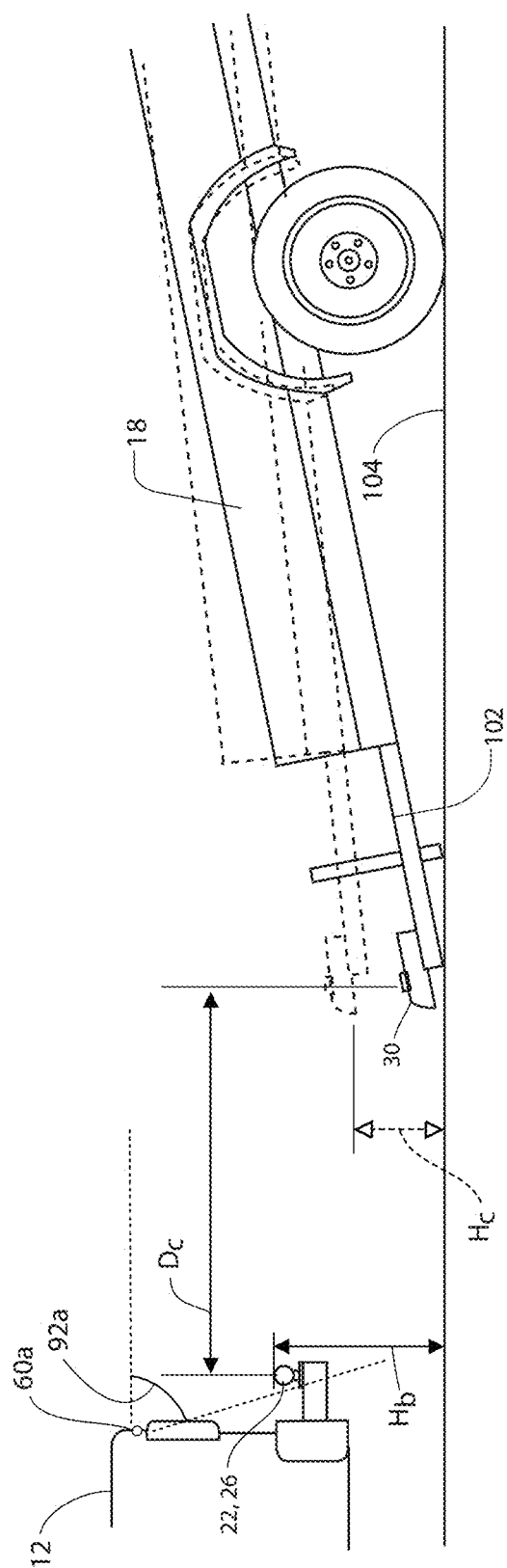
FIG. 6 is a side view demonstrating a height of a coupler in relation to a height of a hitch ball of the vehicle.

Referring to FIGS. 5 and 6, as previously discussed, the hitch assist system 10 may be configured to identify a height $H_c$ of the coupler 16 to determine whether the coupler 16 is compatible or the height $H_c$ is adequate to clear a height $H_b$ of the hitch ball 22. If the system 10 identifies that the height $H_c$ of the coupler 16 is not sufficient to clear the height $H_b$ of the hitch ball 22, the controller 14 may divert or adjust the vehicle path 20 to align the hitch ball 22 with an offset target position 100. The target position 100 may be located near the coupler 16 such that the hitch ball 22 is laterally offset from the trajectory 30 of the trailer 18. In this configuration, the system 10 may be configured to orient the hitch ball 22 at a predetermined or calculated distance from the coupler 16 that is laterally offset relative to the trailer heading direction 30.

The laterally offset position of the target position 100 may provide for the coupler 16 to be lifted by the user U without vertical interference from the hitch ball 22. Additionally, the lateral offset may limit the manual adjustment of the coupler 16 by the user to movement perpendicular to the trailer heading direction 30 such that longitudinal adjustment of the trailer 18 may be avoided. Longitudinal adjustment of the position of the trailer 18 along the trailer heading direction 30 may be significantly harder than lateral adjustment because the mechanical advantage provided by a tongue 102 over the length L extending in front of the wheels of the trailer 18 is not available to adjust the longitudinal position along the trailer heading direction 30. Accordingly, by positioning the hitch ball 22 at the target position 100, the system 10 may significantly limit the effort required for the user U to manually connect the trailer 18 to the vehicle 12.

As demonstrated in FIG. 6, the trailer 18 is shown resting on the ground or an operating surface 104. The height $H_c$ of the coupler 16 in such an example may be identified by the controller 14 based on the image data received from the imaging system 60 to be approximately zero. In such an example, the height $H_c$ of the coupler 16 may be identified as being less than the height $H_b$ of the hitch ball 22. In response to the identification of $H_c < H_b$, the controller 14 may adjust or calculate the vehicle path 20 such that the hitch ball 22 is aligned with an offset target 100. Though discussed in reference to the tongue 102 of the trailer 18 resting on the ground, the controller 14 may similarly respond in situations where the height $H_c$ of the coupler 16 is insufficient to clear or surmount the height $H_b$ of the hitch ball 22.

Referring again to FIGS. 5 and 6, in response to adjusting the vehicle path 20 to align the hitch ball 22 with the target position 100, the controller 14 may also calculate an updated distance to the target position 100 based on an angular difference between a vehicle heading direction 106 and the trailer heading direction 30. For example, as the target position is offset lateral or perpendicularly to the trailer heading direction 30, the distance $D_c$ to coupler 16 may change to a distance $D_t$ to the target position 100. The distance $D_t$ to the target position 100 may be calculated proportionate to the angular difference between the trailer heading direction 30 and the vehicle heading direction 106. Further details regarding the determination of the distance of the lateral offset of the target position 100 and related distance $D_t$ of the hitch ball 22 to the target position 100 are discussed in reference to FIGS. 8A and 8B.

Figure 7:
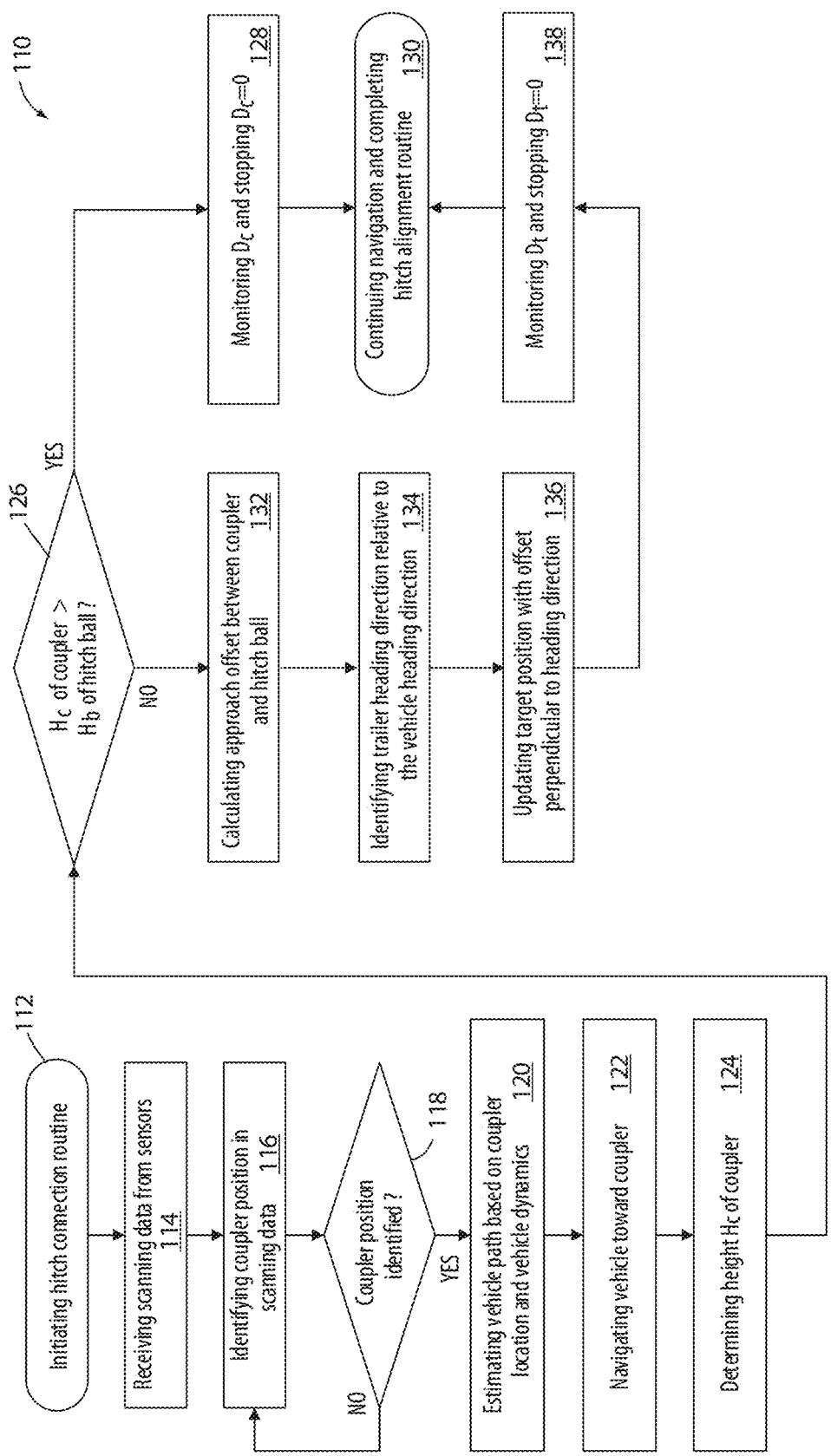
FIG. 7 is a flow chart demonstrating a method to detect a height of the coupler and adjust the height for attachment to the hitch ball.

Referring now to FIG. 7, a flowchart of the method 110 for controlling a navigation of the vehicle 12 to the target position 100 is discussed in further detail. The method 110 may begin by initiating the hitch connection routine (112). As previously discussed, the hitch connection routine (112) may comprise controlling the imaging system 60 to capture image data. The controller 14 may receive the image data and scan the data from the sensors (e.g., the camera system 60) (114). With the scanning data or image data received, the controller 14 may identify the coupler position 24 (116). In step 118, if the coupler position 24 is identified, the method 110 may continue to estimate the vehicle path 20 based on the coupler position 24 and the dynamics of the vehicle 12 (120). If the coupler position 24 is not identified in step 118, the method 110 may return to step 116 to attempt to identify the coupler position 24.

With the vehicle path 20 identified for the hitch connection routine, the controller 14 may continue by navigating the vehicle 12 (e.g., the hitch ball 22) toward the coupler position 24 (122). While navigating the vehicle 12 toward the coupler 16, the controller 14 may continue by determining the height $H_c$ of the coupler 16 (124). The height $H_c$ of the coupler 16 may also be determined when the coupler position 24 is identified in step 116. In step 126, the controller 14 may compare the height $H_c$ of the coupler 16 to the height $H_b$ of the hitch ball 22. If the height $H_c$ of the coupler 16 is greater than the height $H_b$ of the hitch ball 22, the controller 14 may continue the navigation of the vehicle 12 along the vehicle path 20 until the hitch ball 22 is aligned with the coupler 16 such that the distance $D_c$ to terrestrial distance (e.g. the distance excluding the height component) to the coupler 16 is approximately zero (128). Following step 128, the controller 14 may output a notification and complete the hitch alignment routine (130).

If the height $H_c$ is not greater than the height $H_b$ in step 126, the controller 14 may continue to calculate the target position 100 offset from the coupler 16 (132). As previously discussed, the target position 100 may be calculated laterally offset from the coupler 16 in a direction perpendicular to the trailer heading direction 30. Accordingly, in step 134, the controller 14 may be configured to identify the trailer heading direction 30 based on the image data supplied by the imaging system 60. Such an identification may be completed by the controller 14 by applying one or more feature extraction algorithms or filters (e.g. Canny, Sobel, Kayyali, Harris & Stephens/Plessey/Shi-Tomasi). Once the trailer heading direction 30 is identified relative to the vehicle heading direction 106, the controller 14 may calculate the distance $D_t$ to the target position 100 offset from the coupler 16 (136).

Following the calculation of the target position 100, the controller 14 may adjust the vehicle path 20 and control the navigation of the vehicle to align the hitch ball 22 with the target position 100. Accordingly, following step 136, the controller 14 may control the vehicle 12 to traverse the vehicle path 20 until the distance $D_t$ to the target position 100 is approximately zero. Once the hitch ball 22 is aligned with the target position 100 (138), the controller 14 may conclude the hitch alignment routine in step 130.

Figure 8B:
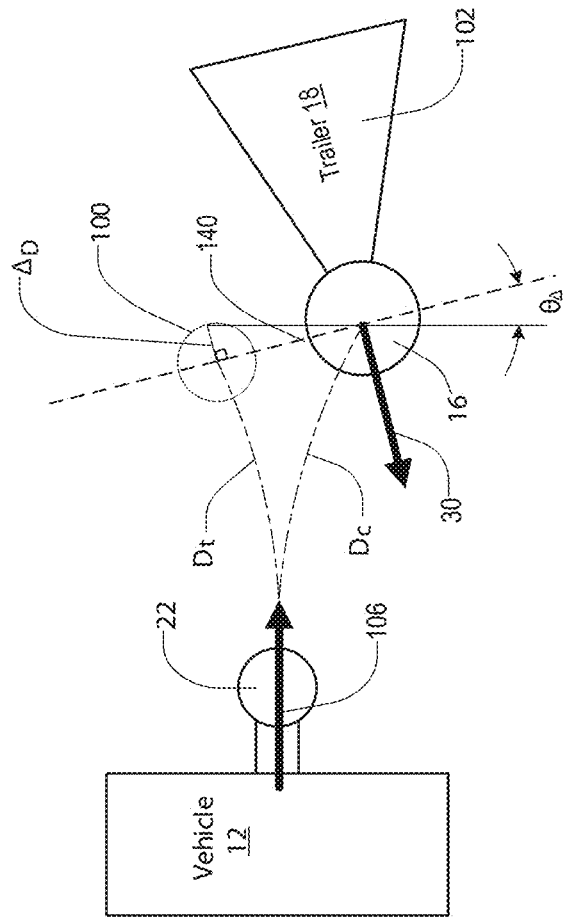
FIG. 8B is a plan view of the coupler aligned with a hitch ball in an offset configuration accounting for a trailer heading direction or trajectory.
Figure 8A:
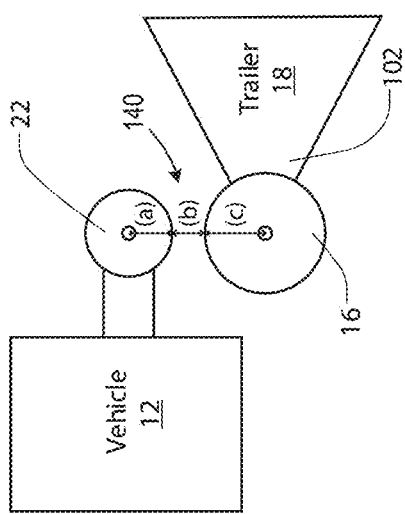
FIG. 8A is a plan view of the coupler aligned with a hitch ball in an offset configuration.

Referring now to FIGS. 8A and 8B, simplified plan views of the coupler 16 of the trailer 18 and the hitch ball 22 of the vehicle 12 are shown demonstrating the offset 140 of the target position 100. As previously discussed, the laterally offset position of the target position 100 may provide for the coupler 16 to be lifted by the user U without vertical interference from the hitch ball 22. Additionally, the lateral offset may limit the manual adjustment of the coupler 16 by the user to movement perpendicular to the trailer heading direction 30 such that longitudinal adjustment of the trailer 18 may be avoided. Longitudinal adjustment of the position of the trailer 18 along the trailer trajectory or heading direction 30 may be significantly harder than lateral adjustment because the mechanical advantage provided by a tongue 102 over the length L extending in front of the wheels of the trailer 18 is not available to adjust the longitudinal position along the trailer heading direction 30. Furthermore, trailer wheel locks or chocks may be employed to secure the trailer 18 if a gradient exists. Accordingly, by positioning the hitch ball 22 at the target position 100, the system 10 may significantly limit the effort required for the user U to manually connect the trailer 18 to the vehicle 12.

As shown in FIG. 8A, the offset 140 may be calculated by the controller 14 as a summation of a partial clearance distance (c) from the center of the coupler 16 to an edge of the coupler, the radius (a) of the hitch ball 22, and a predetermined spacing or cushion distance (b) between the coupler 16 and the hitch ball 22. The clearance distance (c) and the radius (a) of the hitch ball 22 may be radius (a), the cushion distance (b), and/or the clearance distance (c) may be supplied by an input supplied by the user U or otherwise programmed into the controller 14. The cushion distance (b) may be provided to allow space between the coupler 16 and hitch ball 22 during the "lifting" process of the tongue 102. The larger the cushion distance (b), the less likely the tongue 102 will collide with the hitch ball 22 during lifting. However, the smaller the cushion distance (b), the less the user U may have to manually adjust the lateral position of the coupler 16 to connect to the hitch ball 22. Accordingly, the value of the cushion distance (b) may be initially programmed to a predetermined spacing (e.g. 3 cm), which may be adjusted by the user U via the HMI 66.

Referring now to FIG. 8B, the vehicle path 20 may be adjusted to align the hitch ball 22 with the target position 100. In order to align the hitch ball 22 with the target position 100, the controller 14 may calculate an updated distance $D_t$ to the target position 100. The distance $D_t$ to the target position 100 may be calculated based on an angular difference $\theta_A$ between a vehicle heading direction 106 and the trailer heading direction 30. The difference between the distance $D_c$ to the coupler 16 and the distance $D_t$ to the target position 100 may be approximated based on the trigonometric function of the tangent of the angular difference $\theta_A$ to identify a change in distance $\Delta_D$. Accordingly, the controller 14 may determine a side of the coupler 16 to apply the offset 140 or an offset direction by selecting the offset direction that results in the shortest distance $D_t$ from the hitch ball 22 to the target position 100.

The controller 14 may also determine a side of the coupler 16 to apply the offset 140 based on steering $\delta$ of the vehicle 12. For example, the direction of the offset 140 may be determined based on which side of the trailer 18 the vehicle 12 is on, when making the determination of the offset direction. The side of the trailer 18 that the vehicle 12 is on or, more particularly, the direction that the trailer 18 is offset from the hitch ball 22 or the center 96 of the vehicle 12 may be determined based on the steering angle $\delta$. For example, if the steering angle is to the left (negative steering angle) during maneuvering, the trailer 18 must be to the right of the vehicle 12. Conversely, if the steering angle is to the right (positive steering angle), the trailer 18 must be to the left of the vehicle 12 (from the perspective of facing the trailer 18). Accordingly, if the steering angle $\delta$ is less than or equal to zero, the controller 14 may apply the offset 140 to the right. However, if the steering angle δ is greater than zero, the controller 14 may apply the offset 140 to the left (from the perspective of facing the trailer 18 similar to that shown in FIG. 5). In this way, the controller 14 may further determine a direction of the lateral offset 140 relative to the trailer 18.

Figure 9A:
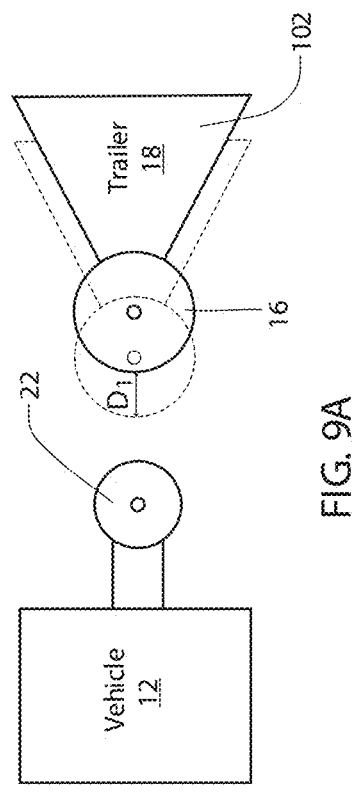
FIG. 9A is a plan view of the coupler aligned with a hitch ball in an offset configuration.
Figure 9B:
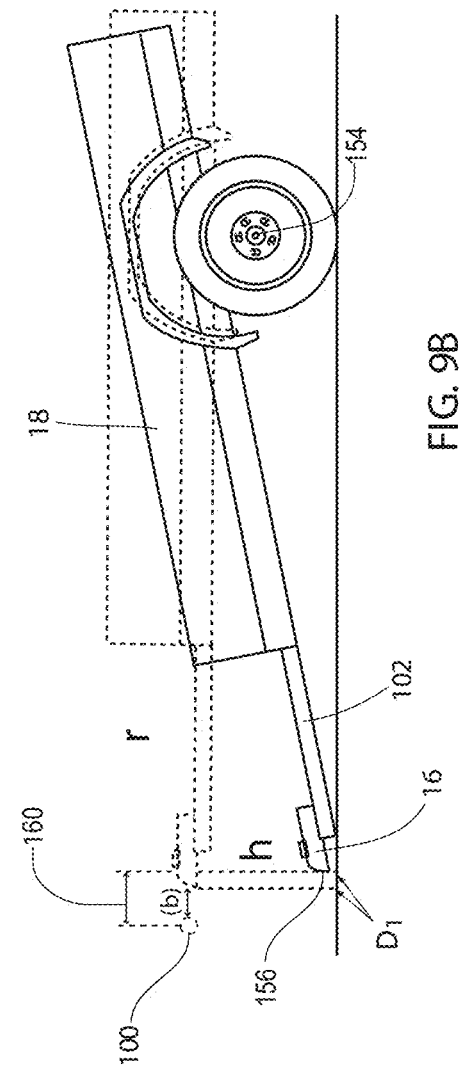
FIG. 9B a plan view of the coupler aligned with a hitch ball in an offset configuration in accordance with the disclosure.

Referring now to FIGS. 9A and 9B, in some implementations, the system 10 may be configured to stop the vehicle 12 such that the coupler 16 is positioned longitudinally offset from the hitch ball 22. In such implementations, the controller 14 may calculate the longitudinal change in distance $D_1$, which may result from the change in distance resulting from the change in the angular orientation of the tongue 102 relative to the operating surface 104 as shown in FIG. 9B. The longitudinal change in distance $D_1$ may be estimated using the trailer clearance length r between a wheel axle 154 of the trailer 18 and a tip 156 of the coupler 16. Further, the height h of the tongue 102 when parallel to the operating surface 104 may be utilized to calculate the longitudinal change in distance $D_1$ as:

$$D_1 = r - \sqrt{r^2 - h^2}$$

Additionally, in some implementations, a nominal value for $D_1$ may be preprogrammed into the system such that the controller 14 may calculate the target position 100 as the distance $D_c$ to the coupler 16 minus the longitudinal change in distance $D_1$. Similar to the lateral offset 140, a longitudinal offset 160 may be calculated by the controller 14 to include a cushion distance (b) added to the longitudinal change in distance $D_1$ of the coupler 16. In this configuration, the controller 14 may calculate the longitudinal offset 160 to ensure that there is adequate separation between the tip 156 of the coupler 16 and the hitch ball 22.

Though discussed separately from the lateral offset 140, in some implementations, the longitudinal offset 160 may be applied to adjust the target position in combination with the lateral offset 140. Such a configuration, may be selected by the user U via the HMI 66. Accordingly, the system 10 may be configured to determine the target position 100 in a variety of ways without departing from the spirit of the disclosure. It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle maneuvering apparatus comprising:
    an imaging device configured to capture image data; and
    a controller in communication with a vehicle maneuvering system configured to:
        identify a coupler position of a trailer in the image data;
        compare a coupler height of the coupler position with a hitch height of a hitch ball;
        in response to the coupler height being insufficient to clear the hitch height, calculate a target position laterally offset from the coupler position; and
        communicate the target position to the vehicle maneuvering system.

2. The apparatus according to claim 1, wherein the controller is further configured to:
    identify a trailer heading direction based on the image data.

3. The apparatus according to claim 2, wherein the trailer heading direction is identified in the image data based on a longitudinal direction of a tongue extending from the coupler.

4. The apparatus according to claim 3, wherein a lateral offset of the target position is calculated in a direction perpendicular to the trailer heading.

5. The apparatus according to claim 2, wherein the controller is further configured to:
    identify a difference between a vehicle heading direction and the trailer heading direction.

6. The apparatus according to claim 5, wherein the controller is further configured to:
    calculate a direction of a lateral offset of the target position relative to the coupler position based on the difference between the vehicle heading direction and the trailer heading direction.

7. The apparatus according to claim 6, wherein the lateral offset is applied in a direction projecting the target position toward the hitch ball based on the difference between the vehicle heading direction and the trailer heading direction.

8. The apparatus according to claim 1, wherein a lateral offset of the target position is calculated based on a radius of the hitch ball and a lateral width of the coupler.

9. The apparatus according to claim 8, wherein the controller is further configured to:
identify the width of the coupler in the image data.

10. The apparatus according to claim 8, wherein the controller is configured to:
identify at least one of the radius and the height of the hitch ball based on the image data.

11. The apparatus according to claim 1, wherein the controller is further configured to:
control the vehicle maneuvering system to control a steering angle and motion of the vehicle aligning the hitch ball with the target position.

12. The apparatus according to claim 1, wherein the controller is further configured to:
determine a side of the coupler to apply a lateral offset of the target position that results in the shortest distance from the hitch ball to the target position.

13. A method for controlling a vehicle comprising:
identifying a coupler position including a coupler height of a trailer in sensor data;
comparing the coupler height with a hitch height of a hitch ball;
in response to the coupler height being insufficient to clear the hitch height, calculating a target position for a hitch ball based on the coupler position; and
controlling a vehicle maneuvering system to control a steering angle and motion of the vehicle aligning the hitch ball with the target position.

14. The method according to claim 13, further comprising:
identifying a trailer heading direction based on the sensor data.

15. The method according to claim 14, wherein the trailer heading direction is identified in the sensor data based on a longitudinal direction of a tongue extending from the coupler.

16. The method according to claim 15, wherein a lateral offset is calculated in a direction perpendicular to the trailer heading.

17. The method according to claim 13, further comprising:
identifying a difference between a vehicle heading direction and the trailer heading direction.

18. The method according to claim 17, further comprising:
calculating a direction of a lateral offset of the target position relative to the coupler position based on the difference between the vehicle heading direction and the trailer heading direction.

19. A vehicle maneuvering system, comprising:
a hitch ball mounted on a vehicle;
a sensor system configured to capture sensor data; and
a controller configured to:
identify a coupler position of a trailer based on the sensor data;
identify a coupler position of a trailer and a trailer heading direction based on the sensor data;
determine a directional difference between a vehicle heading direction and the trailer heading direction;
calculate a direction of a lateral offset of a target position relative to the coupler position based on the difference between the vehicle heading direction and the trailer heading direction; and
control a motion of the vehicle aligning the hitch ball with the target position.

20. The system according to claim 19, wherein lateral offset is applied in a direction projecting the target position toward the hitch ball based on the difference between the vehicle heading direction and the trailer heading direction.

* * * * *